United States Patent
Kim et al.

(10) Patent No.: US 12,273,140 B2
(45) Date of Patent: Apr. 8, 2025

(54) ELECTRONIC DEVICE SUPPORTING WIRELESS COMMUNICATION

(71) Applicant: SAMSUNG ELECTRONICS CO., LTD., Suwon-si (KR)

(72) Inventors: Hyunchul Kim, Suwon-si (KR); Moonseok Kang, Suwon-si (KR); Yi Yang, Suwon-si (KR); Jonghoon Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/100,107

(22) Filed: Jan. 23, 2023

(65) Prior Publication Data

US 2023/0188177 A1    Jun. 15, 2023

Related U.S. Application Data

(63) Continuation of application No. PCT/KR2022/014398, filed on Sep. 27, 2022.

(30) Foreign Application Priority Data

Oct. 27, 2021  (KR) ............... 10-2021-0144689
Dec. 22, 2021  (KR) ............... 10-2021-0185118

(51) Int. Cl.
*H04B 1/7163*   (2011.01)
*H04W 64/00*   (2009.01)

(52) U.S. Cl.
CPC ........ *H04B 1/71637* (2013.01); *H04W 64/00* (2013.01)

(58) Field of Classification Search
CPC .................................................. H04B 1/71637
(Continued)

(56) References Cited

U.S. PATENT DOCUMENTS 11,064,347 B1   7/2021  Dreiling et al.
11,381,277 B2   7/2022  Jang et al.
(Continued)

FOREIGN PATENT DOCUMENTS

CN    112996109    6/2021
EP    2997669      3/2020
(Continued)

OTHER PUBLICATIONS

International Search Report for PCT/KR2022/014398 mailed Dec. 14, 2022, 6 pages.
(Continued)

*Primary Examiner* — Lihong Yu
(74) *Attorney, Agent, or Firm* — NIXON & VANDERHYE P.C.

(57) ABSTRACT

An electronic device according to an embodiment of the disclosure may receive an advertising frame transmitted by an external electronic device through the communication circuit through ultra-wideband (UWB) communication, may receive at least one frame among the advertising frames in a first decision period, may determine whether the number of times an angle based on the at least one frame received in the first decision period is within a specified angle range satisfies a specified condition, and may determine whether the electronic device points to the external electronic device according to whether the specified condition is satisfied.

16 Claims, 9 Drawing Sheets

(58) Field of Classification Search
USPC .......................................................... 375/130
See application file for complete search history.

(56) References Cited

U.S. PATENT DOCUMENTS

| | | |
|---|---|---|
| 2010/0035629 A1 | 2/2010 | Soliman |
| 2011/0320123 A1 | 12/2011 | Choi et al. |
| 2013/0321209 A1 | 12/2013 | Kalliola et al. |
| 2015/0200706 A1 | 7/2015 | Bottazzi et al. |
| 2018/0006689 A1* | 1/2018 | Da Silva .............. H04B 7/0617 |
| 2019/0346533 A1* | 11/2019 | Robinson .................. G01S 3/48 |
| 2020/0100283 A1 | 3/2020 | Naguib et al. |
| 2020/0381805 A1 | 12/2020 | Shiohara |
| 2021/0014677 A1 | 1/2021 | Han et al. |
| 2021/0076350 A1 | 3/2021 | Yang et al. |
| 2022/0007333 A1 | 1/2022 | Lee et al. |
| 2022/0066407 A1* | 3/2022 | Keal .................... G05B 19/042 |
| 2022/0191678 A1 | 6/2022 | Indurkar |
| 2022/0386104 A1 | 12/2022 | Chaugule et al. |
| 2022/0417898 A1 | 12/2022 | Kim et al. |
| 2023/0262641 A1 | 8/2023 | Agarwal et al. |
| 2023/0308861 A1 | 9/2023 | Fan et al. |

FOREIGN PATENT DOCUMENTS

| | | |
|---|---|---|
| KR | 10-2020-0028671 | 3/2020 |
| KR | 10-2021-0116119 | 9/2021 |
| WO | 2020/116949 | 6/2020 |
| WO | 2021/010659 | 1/2021 |
| WO | 2021/033046 | 2/2021 |

OTHER PUBLICATIONS

Written Opinion of the ISA for PCT/KR2022/014398 mailed Dec. 14, 2022, 3 pages.
PCT International Search Report dated Jul. 3, 2024 for PCT/KR2024/001894.
PCT Written Opinion dated Jul. 3, 2024 for PCT/KR2024/001894.
Extended European Search Report dated Sep. 18, 2024 for EP Application No. 22887375.8.

* cited by examiner

ELECTRONIC DEVICE SUPPORTING WIRELESS COMMUNICATION

CROSS-REFERENCE TO RELATED APPLICATIONS

This application is a continuation of International Application No. PCT/KR2022/014398 designating the United States, filed on Sep. 27, 2022, in the Korean Intellectual Property Receiving Office and claiming priority to Korean Patent Application No. 10-2021-0144689, filed on Oct. 27, 2021, in the Korean Intellectual Property Office, and to Korean Patent Application No. 10-2021-0185118, filed on Dec. 22, 2021, in the Korean Intellectual Property Office, the disclosures of all of which are incorporated by reference herein in their entireties.

BACKGROUND

Field

The disclosure relates to a technique for identifying whether an electronic device points to an external electronic device using wireless communication.

Description of Related Art

With the rapid development of wireless communication systems in recent years, demand for services using wireless communication has been increasing, and supply of electronic devices including a wireless communication module has also been increasing. An electronic device supporting ultra-wideband (UWB) communication among various wireless communication methods may provide a precise positioning function. For example, the electronic device may use the angle of arrival (AoA) of a signal received from an external electronic device. Here, the angle of arrival of the signal may be calculated using the distance between two or more antennas receiving the signal and a phase difference of arrival (PDoA) between the signals received by the respective antennas.

Among devices supporting UWB communication, a device that periodically broadcasts a UWB signal in order to provide a specific service or information to a nearby device is included. For example, the device may be referred to as an advertiser, and the UWB signal transmitted by the advertiser may be referred to as an advertising frame. A user may selectively receive and use an advertisement message intended by the user through a pointing operation of pointing to the advertiser with an electronic device, such as a mobile device. In this case, the electronic device may determine whether the electronic device points based on the angle of arrival of the UWB signal including the advertising frame.

Determining that an electronic device points to an external electronic device (advertiser) when the electronic device receives an advertising frame once may reduce accuracy of identifying a pointing operation. For example, even though the electronic device does not point to the external electronic device (advertiser), a case where the electronic device receives an advertising frame may occur.

Further, since advertising frames may be transmitted with different periods depending on advertiser types, it may be difficult to apply a collective condition (e.g., advertising frames are received a certain number of times) in order to identify whether the electronic device points to the advertiser.

SUMMARY

An electronic device according an example embodiment of the disclosure may include: a communication circuit configured to support ultra-wideband (UWB) communication and at least one processor electrically connected to the communication circuit. The at least one processor may be configured to: receive a first frame among advertising frames transmitted by an external electronic device through the communication circuit, the first frame including interval information indicating a period in which the advertising frames are transmitted; determine whether at least one frame among the advertising frames is received in a first decision period and whether an angle determined based on a UWB signal including the received at least one frame is within a specified angle range, based on receiving the first frame; determine whether a number of times the angle based on the at least one frame received in the first decision period is within the specified angle range satisfies a specified condition; and determine whether the electronic device points to the external electronic device, based on whether the specified condition is satisfied.

A method of operating an electronic device according to an example embodiment of the disclosure may include: receiving a first frame among advertising frames transmitted by an external electronic device through a communication circuit supporting ultra-wideband (UWB) communication, the first frame including interval information indicating a period in which the advertising frames are transmitted, determining whether at least one frame among the advertising frames is received in a first decision period and whether an angle determined based on a UWB signal including the received at least one frame is within a specified angle range, based on receiving the first frame, determining whether a number of times the angle based on the at least one frame received in the first decision period is within the specified angle range satisfies a specified condition, and determining whether the electronic device points to the external electronic device, based on whether the specified condition is satisfied.

An electronic device according to an example embodiment of the disclosure may include: a communication circuit configured to support ultra-wideband (UWB) communication and at least one processor electrically connected to the communication circuit. The at least one processor may be configured to: receive a first frame among advertising frames transmitted by an external electronic device through the communication circuit, the first frame including interval information indicating a period in which the advertising frames are transmitted; receive a second frame among the advertising frames in a first decision period, based on receiving the first frame; determine whether a first angle determined based on a UWB signal including the first frame and a second angle determined based on a UWB signal including the second frame are within a specified angle range; determine whether a number of times the first angle and the second angle are within the specified angle range satisfies a specified condition; determine that the electronic device points to the external electronic device, based on the specified condition being satisfied; receive a third frame included in the advertising frames in a first additional period configured at least based on the interval information, based on the specified condition not being satisfied; determine whether a number of times the first angle, the second angle, and a third angle determined based on a UWB signal including the third frame are within the specified angle range satisfies the specified condition; and determine that the electronic device points to the external electronic device, based on the specified condition being satisfied.

According to various example embodiments disclosed herein, accuracy of identifying whether an electronic device points an external electronic device may be improved. Further, even though the external electronic device transmits advertising frames with different periods, the electronic device may apply an optimal condition depending on situations, thereby improving accuracy and speed of identifying a pointing operation.

Effects obtainable from the disclosure are not limited to the effects mentioned above, and other effects not mentioned will be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In describing the drawings, the same or like reference numerals may be used to refer to the same or like elements.

DETAILED DESCRIPTION

Hereinafter, various example embodiments of the disclosure will be described in greater detail with reference to the attached drawings. However, these example embodiments are not intended to limit the disclosure to specific embodiments but construed as including various modifications, equivalents, or alternatives of the embodiments of the disclosure.

Figure 1:
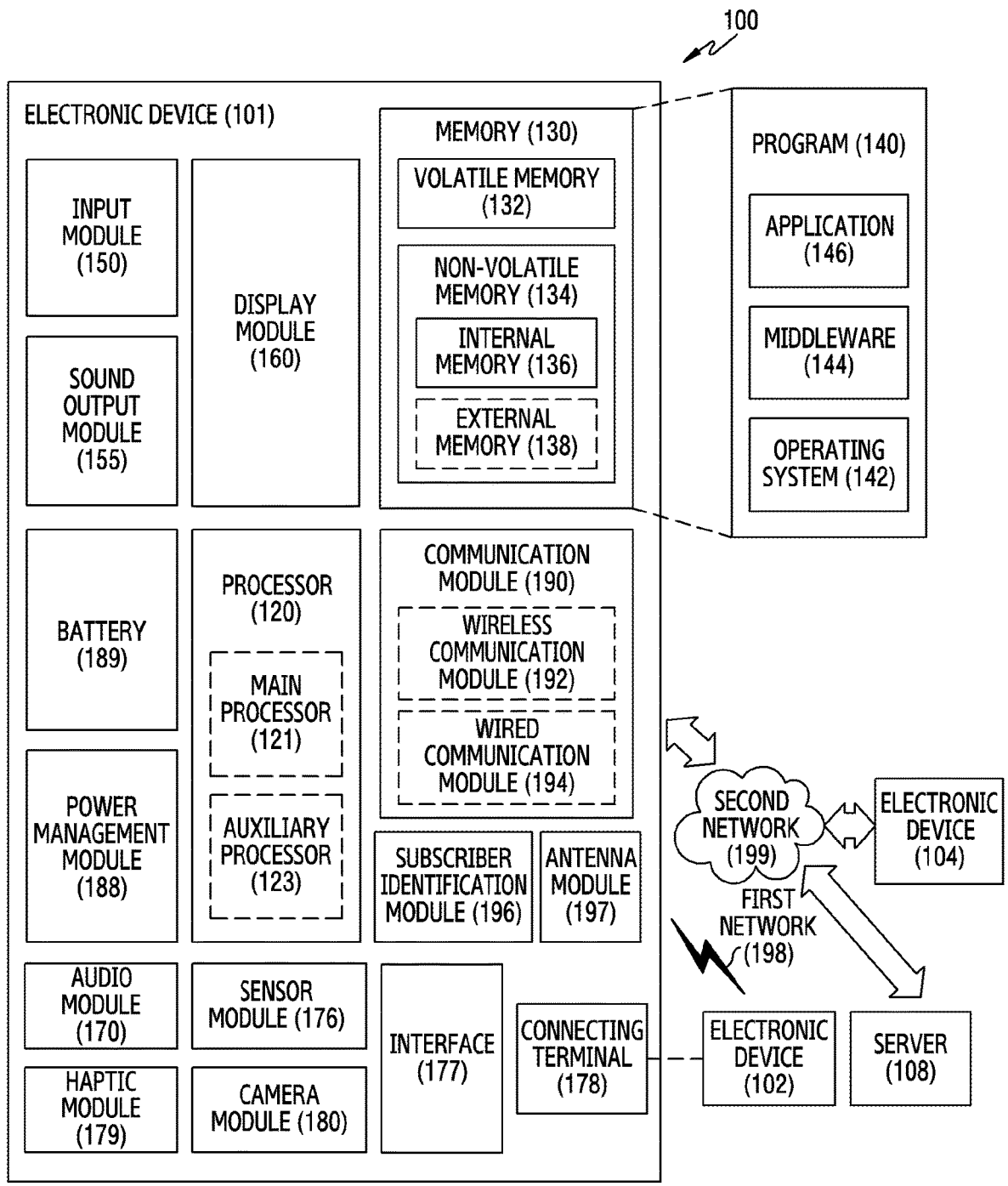
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell. The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
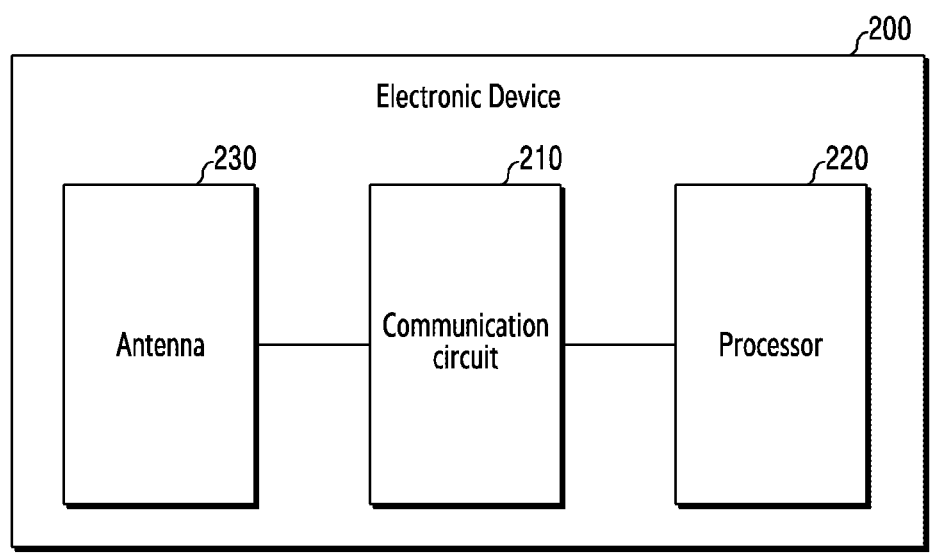
FIG. 2 is a block diagram illustrating an example configuration of an electronic device according to various embodiments.

FIG. 2 is a block diagram illustrating an example configuration of an electronic device 200 according to various embodiments. The electronic device 200 (e.g., the electronic device 101 of FIG. 1) according to an embodiment may include an antenna 230 (e.g., the antenna module 197 of FIG. 1), a communication circuit 210 (e.g., the communication module 190 of FIG. 1), and a processor (e.g., including processing circuitry) 220 (e.g., the processor 120 of FIG. 1). However, the electronic device 200 is not limited to the foregoing configuration. According to various embodiments, the electronic device 200 may further include at least one other component in addition to the foregoing components.

According to an embodiment, the communication circuit 210 may support communication between the electronic device 200 and an external electronic device. For example, the communication circuit 210 may establish wireless communication (e.g., ultra-wideband (UWB) communication) with the external electronic device according to a prescribed communication protocol, and may transmit or receive a signal or data using a frequency band supported by the wireless communication. The communication circuit 210 may support establishing a UWB communication channel (or UWB session) corresponding to a frequency band (e.g., a 3 GHz band (e.g., about 3.735 GHz to 4.8 GHz), a 6 GHz band (e.g., about 6.0 GHz to 7.2 GHz), and/or a 7 GHz band (e.g., about 7.2 GHz to 10.2 GHz)) specified to be used for UWB communication among bands to be used for wireless communication with the external electronic device (e.g., the electronic device 102 of FIG. 1). The communication circuit 210 may support the UWB communication with the external electronic device through the UWB communication channel. In transmission, the communication circuit 210 may convert a baseband signal generated by the processor 220 (e.g., an application processor and/or a communication processor) into an RF signal in a UWB band, and may transmit the RF signal to the outside through the antenna 230 (e.g., a UWB antenna). In reception, the communication circuit 210 may obtain an RF signal in the UWB band through the antenna 230 (e.g., the UWB antenna), may convert the obtained RF signal into a baseband signal, and may transmit the baseband signal to the processor 220.

According to an embodiment, the processor 220 may include various processing circuitry and control at least one other component of the electronic device 200, and may perform various types of data processing or operations. According to an embodiment, the processor 220 may execute an instruction to control operations of the communication circuit 210. In an embodiment, the processor 220 may perform at least one of the operations of the communication circuit 210. According to an embodiment, operations described as being performed by the electronic device 200 in the disclosure may be construed as being performed by the processor 220.

According to an embodiment, the electronic device 200 may include the antenna 230. The antenna 230 may transmit or receive a signal or data to or from the external electronic device. According to an embodiment, the antenna 230 may include a plurality of antennas, and at least one antenna suitable for a communication method used in a short-range communication network or a long-distance communication network among the plurality of antennas may be selected by the communication circuit 210 (or the processor 220) to operate. According to an embodiment, the antenna 230 may include at least one antenna for transmitting an RF signal and at least one antenna for receiving an RF signal. In another example, the antenna 230 may include at least one antenna for transceiving an RF signal. According to an embodiment, the antenna 230 may receive a UWB signal (RF signal in the UWB band) from the external electronic device, or may transmit the UWB signal to the external electronic device.

According to an embodiment, the electronic device 200 may use an angle of arrival (AoA) of a signal received from the external electronic device in a positioning process for the external electronic device. The electronic device 200 may identify the angle of arrival of the signal received from the external electronic device, and may identify an angle at which the external electronic device is positioned with respect to the electronic device 200 through the angle of arrival of the signal. According to an embodiment, the electronic device 200 may calculate the angle of arrival using a distance between two or more antennas receiving the signal from the external electronic device and a phase difference of arrival (PDoA) of the signal received by the antennas.

Figure 3A:
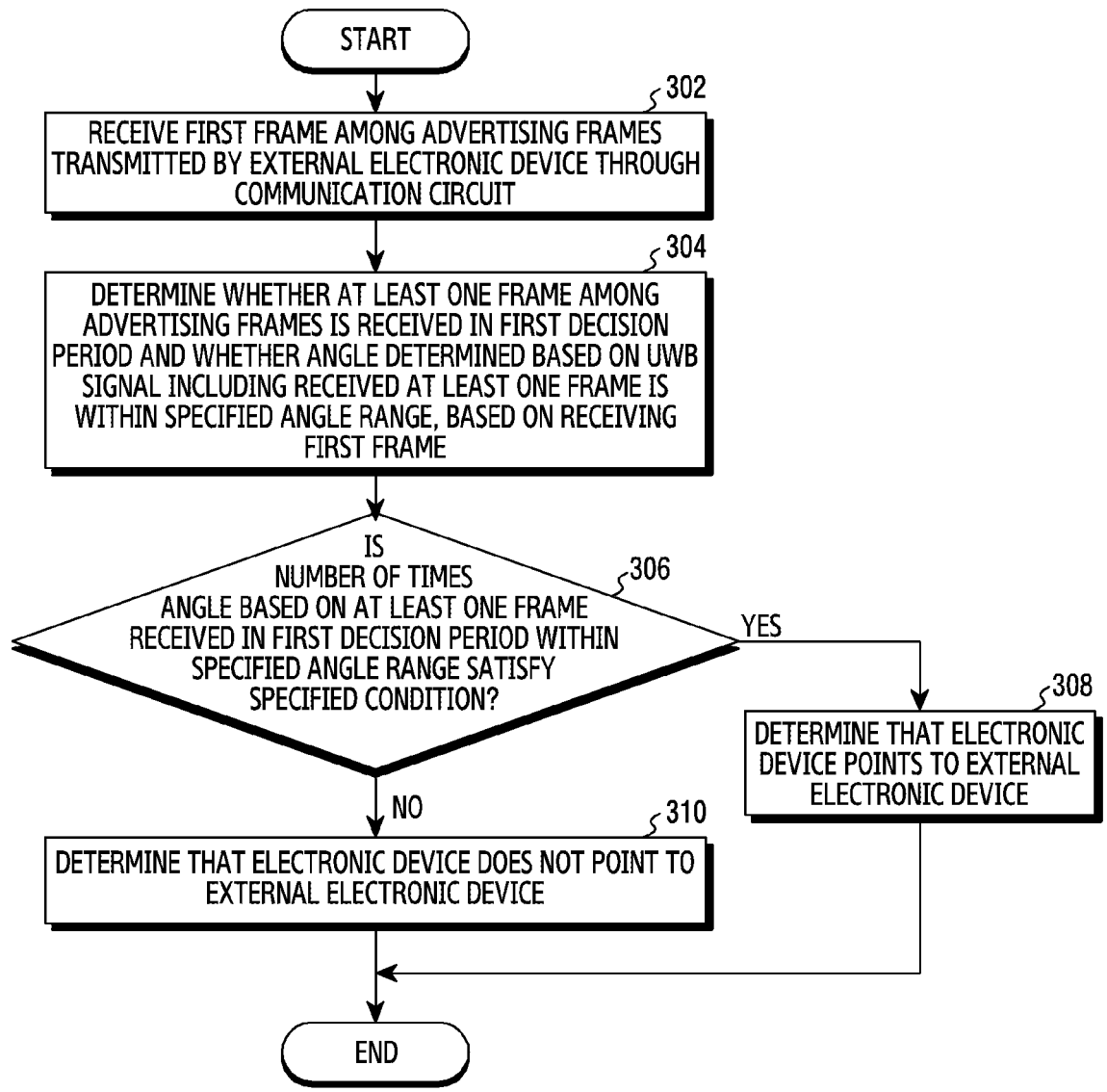
FIG. 3A is a flowchart illustrating an example operation of identifying whether an electronic device points to an external electronic device according to various embodiments.

FIG. 3A is a flowchart illustrating an example operation of identifying whether an electronic device 200 points to an external electronic device (e.g., an external electronic device 402 or 404 of FIG. 4) according to various embodiments. Operations illustrated in FIG. 3A may be performed by the electronic device 200 and/or a processor 220.

According to an embodiment, in operation 302, the processor 220 may receive a first frame among advertising frames transmitted by the external electronic device (e.g., an advertiser) through a communication circuit 210. For example, the communication circuit 210 may receive the first frame through an antenna 230 (e.g., two or more antennas), and may transmit the received first frame to the processor 220. According to an embodiment, the first frame may include interval information indicating a period in which the advertising frames are transmitted. According to an embodiment, the first frame may further include a window size and an offset associated with a time at which the advertising frames are transmitted, along with the interval information. The window size and the offset will be described later with reference to FIG. 4.

According to an embodiment, in operation 304, the processor 220 may determine whether at least one of the advertising frames is received during a first decision period and whether an angle determined based on a UWB signal including the received at least one frame is within a specified angle range, based on receiving the first frame. According to an embodiment, the first decision period may start from a time at which the first frame is received.

According to an embodiment, the processor 220 may receive at least one advertising frame transmitted by the advertiser during the first decision period. The processor 220 may calculate the angle of arrival of a UWB signal including the received advertising frame, and may determine an angle at which the advertising frame is received, based on the angle of arrival. The processor 220 may determine whether the angle at which the advertising frame is received is within a specified angle range. Operation 304 will be described later with reference to FIG. 5 to FIG. 8.

According to an embodiment, in operation 306, the processor 220 may determine whether the number of times the angle based on the at least one frame received during the first decision period is within the specified angle range satisfies a specified condition. For example, the angle based on the frame received during the first decision period may be 5 degrees, 11 degrees, and −3 degrees, and the specified angle range may be from −10 degrees to 10 degrees. In this case, frames corresponding to 5 degrees and −3 degrees may be frames received within the specified angle range, and a frame corresponding to 11 degrees may be a frame received outside the specified angle range.

According to an embodiment, the processor 220 may identify a distance between the electronic device 200 and the external electronic device, and may determine the specified angle range, based on the identified distance. For example, as the distance between the electronic device 200 and the external electronic device is shorter, the processor 220 may configure a wider angle as the specified angle range. According to an embodiment, the processor 220 may measure the distance between the electronic device 200 and the external electronic device, based on a received signal strength indicator (RSSI) or a round-trip time (RTT). According to an embodiment, the processor 220 may measure the distance between the electronic device 200 and the external electronic device, based on Bluetooth Low Energy (BLE) or Wi-Fi.

In the disclosure, a frame received within the specified angle range may refer, for example, to an angle determined based on the angle of arrival of a UWB signal including the frame being within the specified angle range. When an advertising frame is received within the specified angle range, the electronic device 200 may be highly likely to point to the external electronic device (e.g., the advertiser). The first decision period, the angle based on the frame, the specified angle range, and the specified condition be described with reference to specific examples in FIG. 5 to FIG. 8.

According to an embodiment, the processor 220 may determine whether the electronic device 200 points to the external device, based on the number of times the angle based on the at least one frame received during the first decision period is within the specified angle range satisfying the specified condition.

According to an embodiment, in operation 308, the processor 220 may determine that the electronic device 200 points to the external device, based on determining that the number of times the angle based on the at least one frame received during the first decision period is within the specified angle range satisfies the specified condition.

According to an embodiment, in operation 310, the processor 220 may determine that the electronic device 200 does not point to the external device, based on the number of times the angle based on the at least one frame received during the first decision period is within the specified angle range not satisfying the specified condition. However, this case is an example, and the processor 220 may extend the first decision time rather than determining that the electronic device 200 does not point to the external electronic device even when the specified condition is not satisfied. This case will be described in greater detail below with reference to FIG. 3B.

Figure 3B:
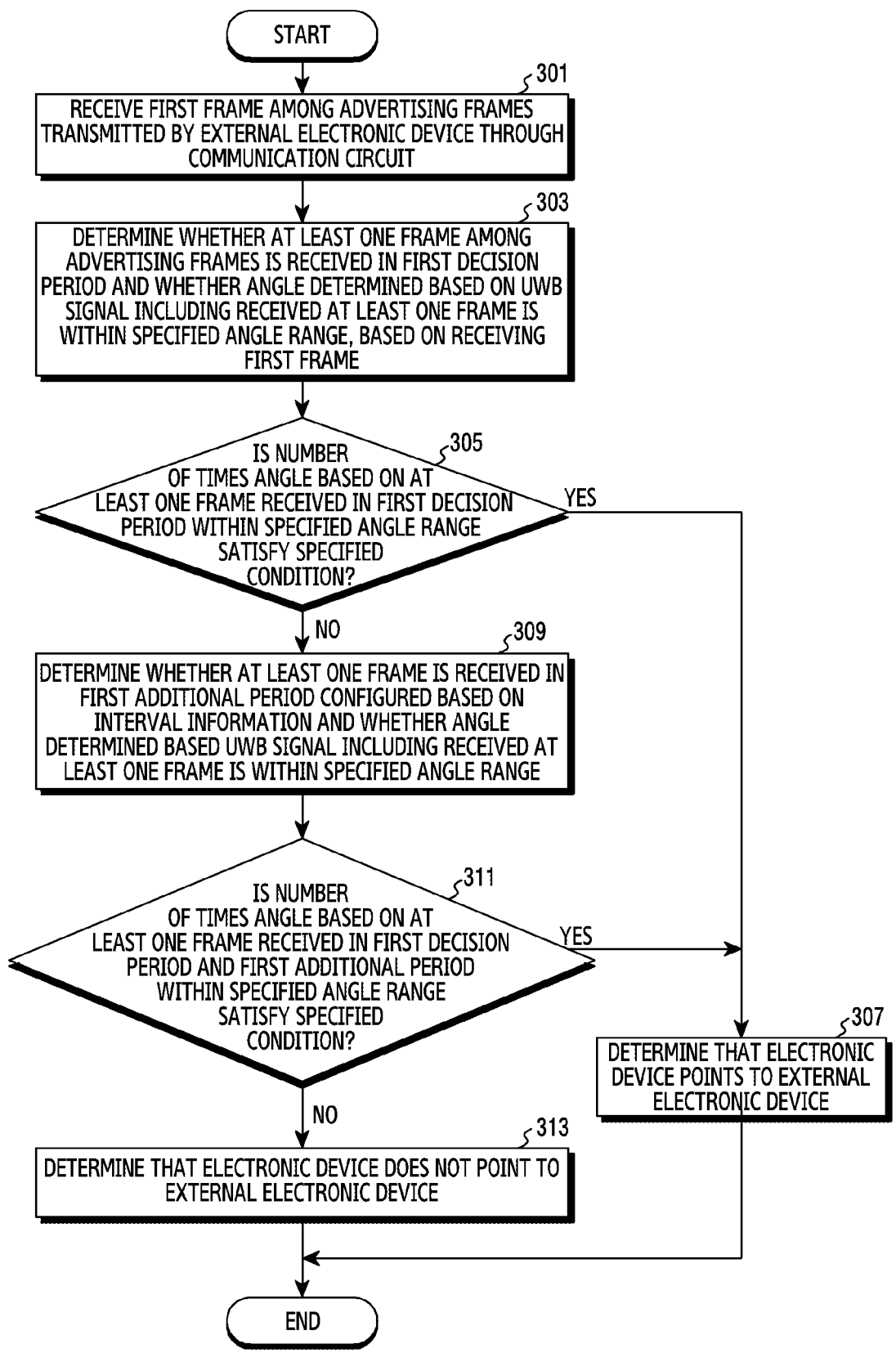
FIG. 3B is a flowchart illustrating an example operation of identifying whether an electronic device points to an external electronic device according to various embodiments.

FIG. 3B is a flowchart illustrating an example operation of identifying whether an electronic device 200 points to an external electronic device according to various embodiments. Operations illustrated in FIG. 3B may be performed by the electronic device 200 and/or a processor 220.

According to an embodiment, in operation 301, the processor 220 may receive a first frame among advertising frames transmitted by the external electronic device (e.g., an advertiser) through a communication circuit 210. Operation 301 may correspond to operation 302 of FIG. 3A.

According to an embodiment, in operation 303, the processor 220 may determine whether at least one of the advertising frames is received during a first decision period and whether an angle determined based on a UWB signal including the received at least one frame is within a specified angle range, based on receiving the first frame. Operation 303 may correspond to operation 304 of FIG. 3A.

According to an embodiment, in operation 305, the processor 220 may determine whether the number of times the angle based on the at least one frame received during the first decision period is within the specified angle range satisfies a specified condition. Operation 305 may correspond to operation 306 of FIG. 3A.

According to an embodiment, in operation 307, the processor 220 may determine that the electronic device 200 points to the external device, based on determining that the number of times the angle based on the at least one frame received during the first decision period is within the specified angle range satisfies the specified condition. For example, the processor 220 may determine that the electronic device 200 points to the external device regardless of whether the first decision period expires, based on the specified condition being satisfied. For example, even when some of the first decision period remains, the processor 220 may terminate the first decision period, and may determine that the electronic device 200 points to the external device. In another example, even when the specified condition is satisfied, the processor 220 may not determine that the electronic device 200 points to the external device but may defer determination for a predetermined time. An example of deterring determination will be described in greater detail below with reference to FIG. 8. According to an embodiment, when the processor 220 determines that the electronic device 200 points to the external electronic device, the processor 220 may determine that the advertising frame received from the external electronic device is an advertisement message intended by a user (e.g., the user intends to receive), and may display a related screen.

According to an embodiment, in operation 309, the processor 220 may determine whether at least one frame among the advertising frames is further received during a first additional period configured at least based on interval information and whether an angle determined based on a UWB signal including the received at least one frame is within the specified angle range, based on determining that the number of times the angle based on the at least one frame received during the first decision period is within the specified angle range does not satisfy the specified condition. According to an embodiment, operation 309 may correspond to operation 303 except for a time (e.g., the first decision period and the first additional period). For example, the specified angle range in operation 309 may correspond to the specified angle range in operation 303.

According to an embodiment, when the specified condition is not satisfied, the processor 220 may extend the first decision period by the first additional period, based on whether the external electronic device is included in pointing candidates. For example, when one or more frames are received within the specified angle range during the first decision period, the processor 220 may determine that the external electronic device is a pointing candidate. When the external electronic device corresponds to the pointing candidate, the processor 220 may further receive advertising frames during the first additional period. In another example, when one or more frames are not received within the specified angle range during the first decision period, that is, when the external electronic device is not a pointing candidate, the processor 220 may not configure the first additional period, and may determine that the electronic device 200 does not point to the external electronic device. According to an embodiment, when the external electronic device does not correspond to a pointing candidate, the processor 220 may not perform an operation of receiving advertising frames (e.g., operation 309 and operation 311) during the first additional period.

According to an embodiment, the processor 220 may determine the first additional period, based at least on the interval information. For example, when receiving the interval information indicating that a period in which the advertising frames are transmitted is 200 ms, the processor 220 may determine the first additional period to be 200 ms. However, this is an example, and determining the first additional period will be described in detail later with reference to FIG. 5 to FIG. 7. According to an embodiment, the processor 220 may determine the first additional period, based on the interval information, a window size, and/or an offset. The first additional period determined based on the interval information, the window size, and/or the offset will also be described in detail later with reference to FIG. 5 to FIG. 7.

According to an embodiment, in operation 311, the processor 220 may determine whether the number of times the angle based on the at least one frame received during the first decision period and the first additional period is within the specified angle range satisfies the specified condition. According to an embodiment, operation 311 may correspond to operation 305 except for a time (e.g., the first decision period, and the first decision period and the first additional period). For example, the specified condition in operation 311 may correspond to the specified condition in operation 305.

According to an embodiment, the processor 220 may determine whether the electronic device 200 points to the external electronic device according to determination in operation 311.

According to an embodiment, the processor 220 may determine that the electronic device 200 points to the external electronic device in operation 307, based on the specified condition being satisfied in operation 311 (e.g., 'Yes' in operation 311 of FIG. 3B).

According to an embodiment, in operation 313, the processor 220 may determine that the electronic device 200 does not point to the external electronic device, based on the number of times the angle based on the at least one frame received during the first decision period and the first additional period is within the specified angle range not satisfying the specified condition.

Figure 4:
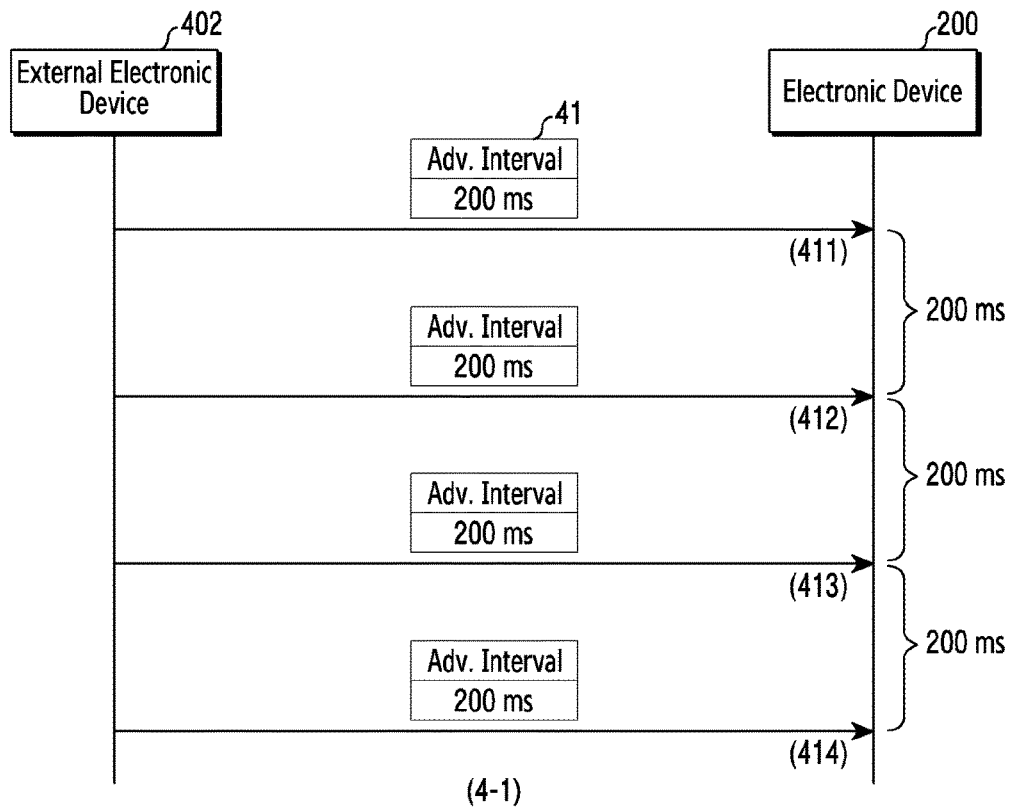
FIG. 4 is a diagram illustrating an example in which an electronic device receives advertising frames transmitted by an external electronic device according to various embodiments.
Figure 4:
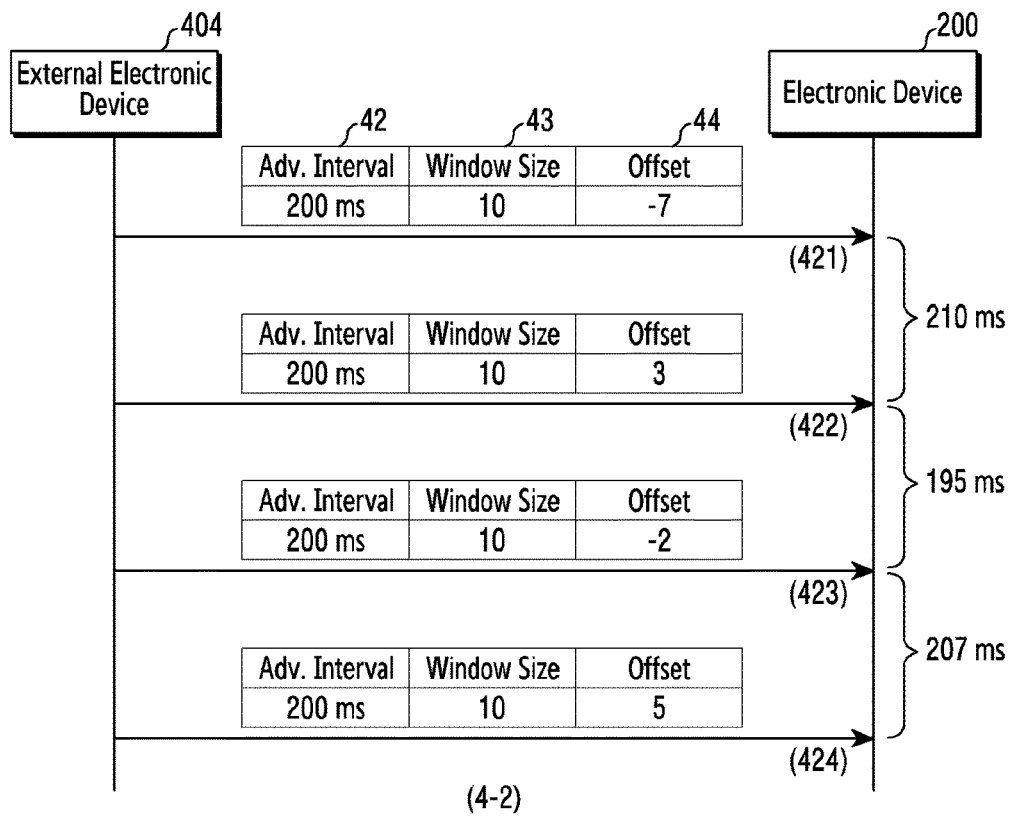

FIG. 4 is a diagram illustrating an example in which an electronic device 200 receives advertising frames transmitted by external electronic devices 402 and 404 according to various embodiments.

According to an embodiment, the electronic device 200 may be a mobile phone, and may also be various electronic devices, such as a mobile device, a tablet PC, a notebook computer, or the like.

According to an embodiment, a communication circuit 210 of the electronic device 200 may support communication with the external electronic devices 402 and 404. For example, the communication circuit 210 may receive data from the external electronic devices 402 and 404 using UWB communication. For example, with an antenna 230 (e.g., an RX antenna) activated, the electronic device 200 may wait to receive an advertising frame transmitted by the external electronic devices 402 and 404, and may receive the advertising frame through the RX antenna.

According to an embodiment, the external electronic devices 402 and 404 may transmit an advertising frame. For example, the external electronic devices 402 and 404 may be advertisers that periodically broadcast an advertising frame. According to an embodiment, the external electronic devices 402 and 404 may transmit an advertising frame to provide a specific service or information to peripheral devices. The electronic device 200 may receive the advertising frame transmitted by the external electronic devices 402 and 404, and may perform an operation corresponding to the advertising frame when a specified condition is satisfied. For example, the electronic device 200 may provide (e.g., display on a display) an advertisement message corresponding to the advertising frame for a user.

According to an embodiment, referring to reference numeral 4-1, the external electronic device 402 may transmit advertising frames 411, 412, 413, and 414. The electronic device 200 may receive the advertising frames 411, 412, 413, and 414 through the communication circuit 210. For example, the electronic device 200 may receive a first frame 411, a second frame 412, a third frame 413, and a fourth frame 414 among the advertising frames.

According to an embodiment, a period in which the external electronic device 402 transmits the advertising frames 411, 412, 413, and 414 may be 200 ms. The external electronic device 402 may transmit the advertising frames 411, 412, 413, and 414 every 200 ms. A processor 220 may receive the advertising frames 411, 412, 413, and 414 transmitted with a period of 200 ms. For example, an interval between the first frame 411 and the second frame 412 received by the electronic device 200 may be 200 ms.

According to an embodiment, each of the advertising frames 411, 412, 413, and 414 transmitted by the external electronic device 402 may include interval information 41 about the period. For example, the first frame 411 among the advertising frames may include the interval information 41 indicating the period (e.g., 200 ms) in which the advertising frames 411, 412, 413, and 414 are transmitted.

According to an embodiment, referring to reference numeral 4-2, the external electronic device 404 may transmit advertising frames 421, 422, 423, and 424. The electronic device 200 may receive the advertising frames 421, 422, 423, and 424 through the communication circuit 210. For example, the electronic device 200 may receive a first frame 421, a second frame 422, a third frame 423, and a fourth frame 424 among the advertising frames.

According to an embodiment, the external electronic device 404 may configure a timing window with a predetermined size, and may transmit the advertising frames at random times within the timing window in order to prevent and/or reduce a frame transmitted by another nearby advertiser and the advertising frames transmitted by the external electronic device 404 from interfering with each other. According to an embodiment, a period in which the external electronic device 404 transmits the advertising frames 421, 422, 423, and 424 may be 200 ms, and a window size may be 10. The unit of the window size may be a slot. The external electronic device 404 may transmit the advertising frames 421, 422, 423, and 424 at random times within 10 slots every 200 ms. For example, the external electronic device 404 may transmit the advertising frames within {(200×number of transmissions)±10 slots}. The disclosure is described assuming that one slot duration is 1 ms, but one slot duration may not be 1 ms in an embodiment. In an embodiment, the external electronic device 404 may randomly determine to transmit the advertising frames within the timing window. A time randomly determined within the window size may be different depending on each of the advertising frames 421, 422, 423, and 424. For example, the first frame 421 may be transmitted in a {(200×N)−7}th slot, the second frame 422 may be transmitted in a {(200×(N+1))+3}th slot, the third frame 423 may be transmitted in a {(200×(N+2))−2}th slot, and the fourth frame 424 may be transmitted in a {(200×(N+3))+5}th slot.

According to an embodiment, each of the advertising frames 421, 422, 423, and 424 transmitted by the external electronic device 404 may include interval information 42 about the period, the window size 43, and an offset 44. For example, the first frame 421 among the advertising frames may include the interval information 42 indicating the period (e.g., 200 ms) in which the advertising frames 421, 422, 423, and 424 are transmitted, and may further include information indicating that the window size 43 is 10 slots and the offset 44. The offset 44 may indicate a difference between a slot (or time) in which a corresponding frame (e.g., the first frame 421) is transmitted and a (200×number of transmissions)th slot.

Referring to FIG. 4, since the first frame 421 is transmitted in a {(200×N)−7}th slot and the second frame 422 is transmitted in a {(200×(N+1))+3}th slot, an interval between the first frame 421 and the second frame 422 received by the electronic device 200 may be 210 ms. Further, since the second frame 422 is transmitted in the {(200×(N+1))+3}th slot and the third frame 423 is transmitted in a {(200×(N+2))−2}th slot, an interval between the second frame 422 and the third frame 423 received by the electronic device 200 may be 195 ms. In addition, the third frame 423 is transmitted in the {(200×(N+2))−2}th slot and the fourth frame 424 is transmitted in a {(200×(N+3))+5}th slot, an interval between the third frame 423 and the fourth frame 424 received by the electronic device 200 may be 207 ms. However, in FIG. 4, a description has been made assuming that it takes the same time for the electronic device 200 to receive all advertising frames transmitted by the external electronic device 404.

Figure 5:
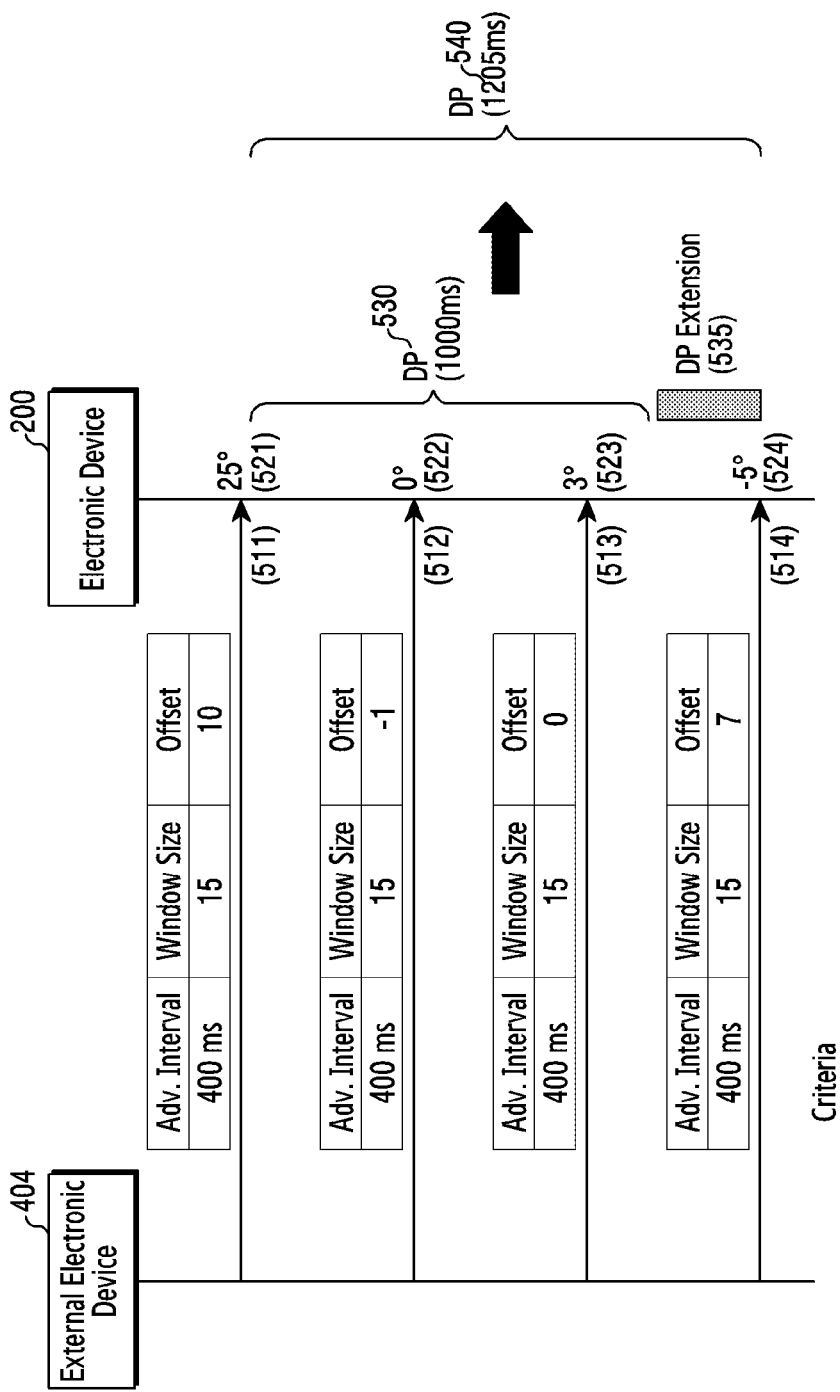
FIG. 5 is a diagram illustrating an example of identifying whether an electronic device points to an external electronic device during an extended decision period according to various embodiments.

FIG. 5 is a diagram illustrating an example of identifying whether an electronic device points to an external electronic device during an extended decision period according to various embodiments.

According to an embodiment, the external electronic device 404 may transmit advertising frames 511, 512, 513, and 514 with a period of 400 ms and a window size of 15. For example, an offset of a first frame 511 may be 10, an offset of the second frame 512 may be −1, an offset of a third frame 513 may be and an offset of a fourth frame 514 may be 7.

According to an embodiment, a processor 220 may receive the first frame 511 among the advertising frames transmitted by the external electronic device 404. The first frame 511 may include interval information indicating the period (e.g., 400 ms) in which the advertising frames are transmitted, the window size, and the offset.

According to an embodiment, the processor 220 may receive at least one frame 511, 512, or 513 among the advertising frames during a first decision period 530 (e.g., 1000 ms=1 s), based on receiving the first frame 511. The processor 220 may determine that the first decision period 530 starts from a time when the first frame 511 is received. According to an embodiment, the electronic device 200 may determine that the first decision period 530 corresponding to a predetermined time starts in response to receiving the first frame 511. For example, the first decision period 530 may be a time previously specified by the electronic device 200. According to an embodiment, the electronic device 200 may determine the length of the first decision period 530, based on the interval information 42 included in the first frame 511, in response to receiving the first frame 511. For example, the electronic device 200 may configure the first decision period to a longer time as the period in which advertising frames are received is longer.

According to an embodiment, the processor 220 may receive the at least one frame through an antenna 230 (e.g., two or more antennas), and may configure the angle of arrival of each advertising frame, based on a UWB signal including the received frame. The processor 220 may determine that an angle 521 determined based on the first frame 511 is 25 degrees, an angle 522 determined based on the second frame 512 is 0 degrees, and an angle 523 determined based on the third frame 513 is 3 degrees. The angles 521, 522, and 523 may correspond to angles of arrival at which the respective frames are received. For example, when a user moves the electronic device 200 to point to the external electronic device, the angles 521, 522, and 523 determined based on the advertising frames (e.g., the first frame 511, the second frame 512, and the third frame 513) received by the electronic device 200 may vary.

According to an embodiment, the processor 220 may determine whether the number of times the angles 521, 522, and 523 determined based on the received frame are within a specified angle range satisfies a specified condition. For example, the specified angle range may be −10 degrees to 10 degrees, and the specified condition may be a condition that frames are received successively three times. According to an embodiment, the specified angle range may be an angle range stored in advance by the electronic device 200. According to an embodiment, the specified condition may be a condition stored in advance by the electronic device 200. According to an embodiment, the specified condition may be a condition determined by the electronic device 200 receiving the first frame 511 from the external electronic device 404, based on information (e.g., the interval information 42 about the period in which the advertising frames are transmitted) included in the first frame 511. For example, the processor 220 may receive the first frame 511, may identify the number of advertising frames receivable within the first decision period 530, based on the interval information 42, the window size 43, and the offset 44 included in the first frame 511, and may determine that the specified condition is satisfied when a certain percentage (e.g., 70%) or greater of the identified number is received.

According to an embodiment, since the angle 521 based on the first frame 511 is 25 degrees, the processor 220 may determine that the angle 521 is not within the specified angle range. Since the angle 522 based on the second frame 512 is 0 degrees, the processor 220 may determine that the angle 522 is within the specified angle range. Since the angle 523 based on the third frame 513 is 3 degrees, the processor 220 may determine that the angle 523 is within the specified angle range.

According to an embodiment, since the number of times the first frame 511, the second frame 512, and the third frame 513 received during the first decision period 530 is within the specified angle range, the processor 220 may determine that the specified condition (e.g., three times in a row) is not satisfied. However, since there are two frames (e.g., the second frame 522 and the third frame 523) within in the specified angle range among the frames received during the first decision period 530, the processor 220 may determine that the external electronic device 404 corresponds to a pointing candidate.

According to an embodiment, the processor 220 may determine a first additional period 535, based on the interval information (e.g., 400 ms), the window size (e.g., 15), and the offset. According to an embodiment, since the processor 220 needs to receive an advertising frame once to determine whether the specified condition is satisfied, the processor 220 may configure the first additional period 535 enough to receive the fourth frame 514.

For example, when a time at which the first frame 511 is received is set to 10 ms (e.g., the offset of the first frame 511), the processor 220 may determine to be able to receive the fourth frame 514 within {(400×3)+15} ms. The processor 220 may not know the offset of the fourth frame 514 before the fourth frame 514 is received, but is able to know that the fourth frame 514 is received within {(400×number of transmissions)±15} ms, based on information about the window size included in the first frame 511 to the third frame 413, thus determining a first extended decision period 540 as a maximum time of {(400×3)+15−10} ms. For example, the processor 220 may determine 205 ms obtained by subtracting the first decision period 530 of 1000 ms from the first extended decision period 540 of 1205 ms as the first additional period 535.

In another example, the processor 220 may extend the decision period by the first additional period 535 to a time to receive the fourth frame 514. The processor 220 may extend the decision period by a time of 400 ms corresponding to the interval information 42 plus 15 ms (e.g., assuming that one slot is 1 ms) corresponding to the window size 43, based on a time at which the third frame 513, which is last received in the first decision period 530, is received. Accordingly, the processor 220 may determine the first extended decision period 540 as time added by 415 ms from the time at which the third frame 513 is received. In the embodiment of FIG. 5, since time from the time at which the first frame 511 is received to the time at which the third frame 513 is received is {(400×2)−10} ms=790 ms, the first extended decision period may be (790+415) ms=1205 ms. However, the offset of the third frame 513 is 0 in the embodiment of FIG. 5, but the offset of the frame last received within the first decision period may not be 0 in an embodiment. In this case, the processor 220 may determine the first extended decision period, based on a time at which the offset of the frame last received within the first decision period is assumed to be 0.

According to an embodiment, the length of the first extended decision period 540 may be determined as {(period (e.g., 400) included in interval information×number of times frames are received (e.g., 3))+window size (e.g., 15)−offset (e.g., 10) of first frame 511}=1205 ms.

According to an embodiment, the processor 220 may receive the fourth frame 514 among the advertising frames transmitted by the external electronic device 404 during the first additional period 535. The processor 220 may determine that an angle 521 determined based on the first frame 511 is 25 degrees, the angle 524 determined based on the fourth frame 514 is −5 degrees, and may determine that the angle 524 is within the specified angle range (e.g., −10 degrees to 10 degrees).

According to an embodiment, since the angles 521, 522, 523, and 524 based on the frames 511, 512, 513, and 514 received during the first decision period 530 and the first additional period 535, that is, the first extended decision period 540, are within the specified angle range three times in a row (e.g., the second frame 512, the third frame 513, and the fourth frame 514), the processor 220 may determine that the specified condition (e.g., three times in a row) is satisfied. According to an embodiment, the processor 220 may determine that the electronic device 200 points to the external electronic device 404.

Figure 6:
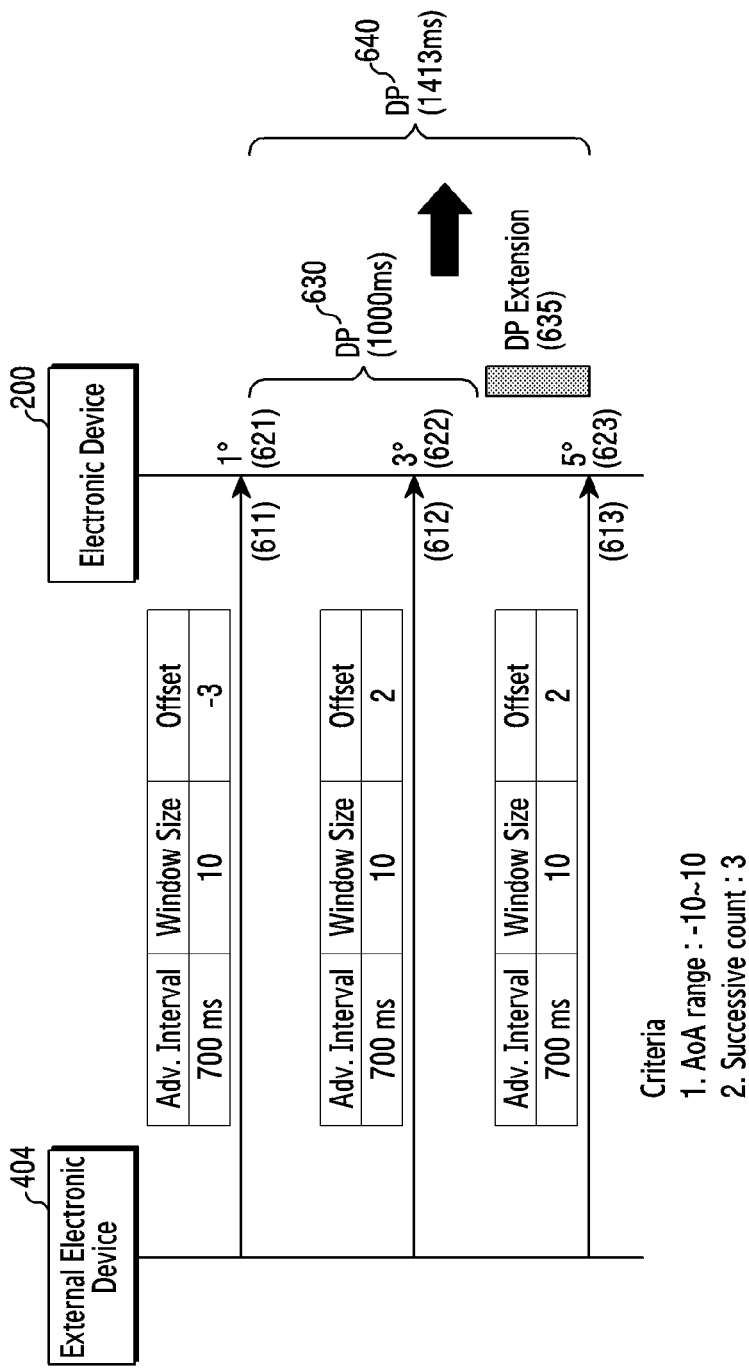
FIG. 6 is a diagram illustrating an example of identifying whether an electronic device points to an external electronic device during an extended decision period according to various embodiments.

FIG. 6 is a diagram illustrating an example of identifying whether an electronic device points to an external electronic device during an extended decision period according to various embodiments.

According to an embodiment, details described with reference to FIG. 5 may also be applied to FIG. 6 except for specific examples (the interval information, the window size, the offsets, the first extended decision period, and the like). In FIG. 6, a description will be made except for the details described with reference to FIG. 5.

According to an embodiment, the external electronic device 404 may transmit advertising frames 611, 612, and 613 with a period of 700 ms and a window size of 10 slots. A processor 220 may receive a first frame 611 among the advertising frames. The processor 220 may start a first decision period 630 (e.g., 1000 ms), based on receiving the first frame 611. The processor 220 may further receive a second frame 612 during the first decision period 630. Since an angle 621 based on the first frame 611 is 1 degree, the processor 220 may determine that the angle 621 is within a specified angle range (e.g., −10 degrees to 10 degrees), and since an angle 622 based on the second frame 612 is 3 degrees, the processor 220 may determine that the angle 622 is within the specified angle range. Since the number of times the angles 621 and 622 based on the frames 611 and 612 received during the first decision period 630 are within the specified angle range is 2, the processor 220 may determine that a specified condition (e.g., three times) is not satisfied. Since the frames 611 and 612 within the specified angle range are received during the first decision period 630, the processor 220 may determine that the external electronic device 404 is a pointing candidate.

According to an embodiment, when a time at which the first frame 611 is received is set to −3 (e.g., an offset of the first frame 611), the processor 220 may determine that a time at which a third frame 613 is expected to be received is at most {(700×2)+10} ms. Accordingly, the processor 220 may determine a first additional period 635 as 413 ms, and may determine a first extended decision period 640 as 1413 ms.

According to an embodiment, since the number of times the angles 621, 622, and 623 based on the frames 611, 612, and 613 received during the first decision period 630 and the first additional period 635, that is, the first extended decision period 640, are within the specified angle range is 3, the processor 220 may determine that the specified condition is satisfied, and may determine that the electronic device 200 points to the external electronic device.

According to an embodiment, although that the specified condition is described as a condition that frames are received successively three times in FIG. 5 and FIG. 6, the processor 220 may variously configure the specified condition. For example, since the number of frames receivable received during the first decision period (e.g., 1 s) varies according to a period in which the advertising frames are transmitted, the specified condition may also be changed. When interval information included in an advertising frame is 100 ms, the electronic device 200 may receive 11 frames during the first decision period (e.g., 1000 ms), and thus the specified condition may be a condition that five frames are successively received within the specified angle range. When the interval information included in the advertising frame is 300 ms, the electronic device 200 may receive three frames during the first decision period (e.g., 1000 ms), and thus the specified condition may be a condition that frames are received successively three times. In another example, the specified condition may be a condition that a certain number or greater of frames are within the specified angle range even though not being successive. When the interval information included in the advertising frame is 100 ms, the electronic device 200 may determine a condition of receiving seven frames during the first decision period as the specified condition. Further, when a frame received within the specified angle range during the first decision period is included in a field of view (FOV) of the electronic device 200 and a frame received outside the specified angle range is not included in the FOV of the electronic device 200, the processor 220 may also determine that the specified condition is satisfied. In another example, when the interval information (e.g., a period in which the advertising frame is transmitted being 3 s) included in the advertising frame corresponds to a longer time than the first decision period (e.g., 1 s), the processor 220 may determine whether the electronic device points using only the first frame.

According to an embodiment, when whether the electronic device points is difficult to be identified within the first decision period, the processor 220 may further receive an advertising frame during the first additional period. In this case, the processor 220 may limit the length of the first additional period to less than a predetermined period. For example, the processor 220 may limit the first extended decision period to extend to be 1.5 times, 1.25 times, or up to 2 times the first decision period, based on the number of frames received during the first decision period or the number of frames received within the specified angle range during the first decision period.

Figure 7:
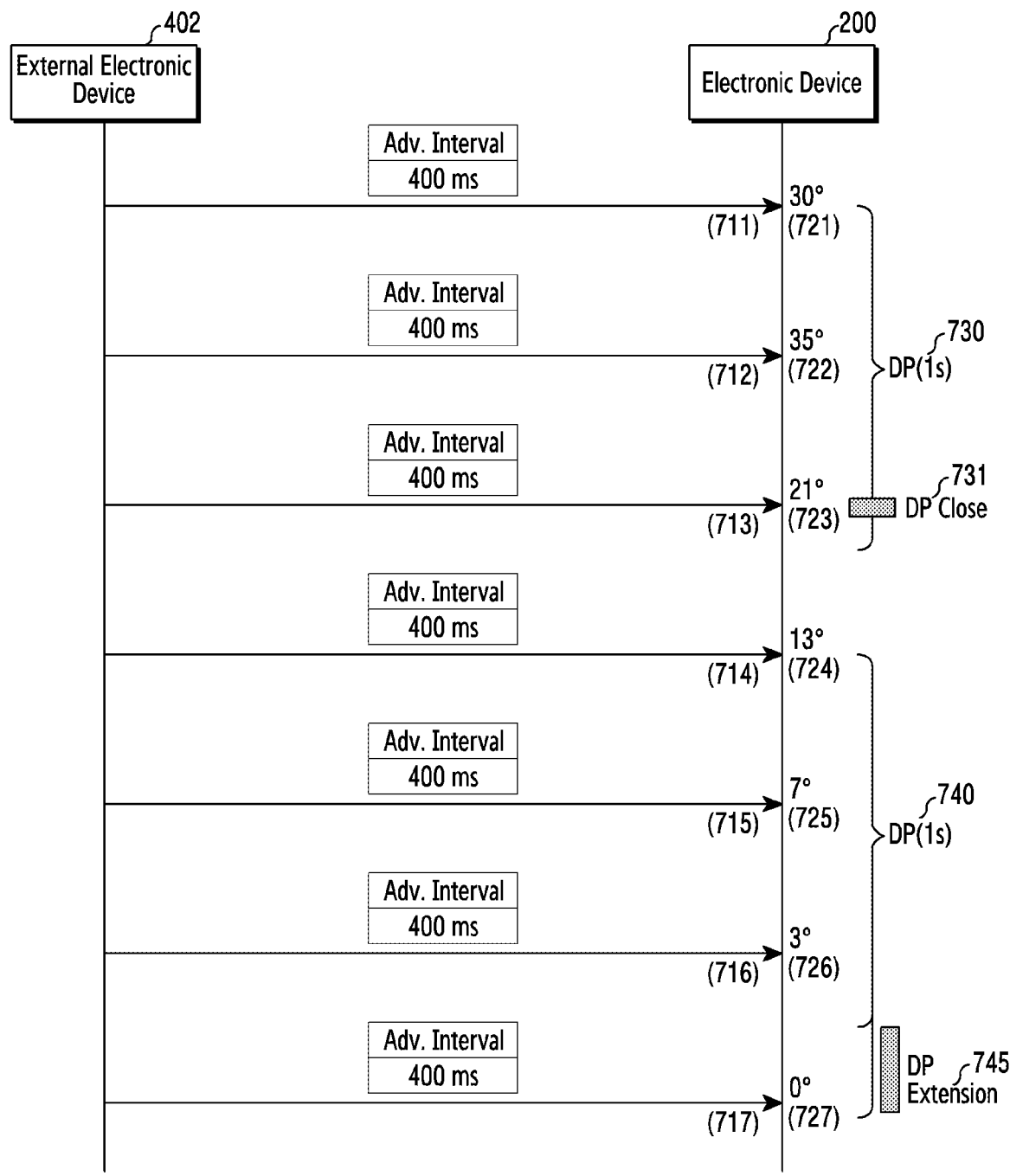
FIG. 7 is a diagram illustrating an example of identifying whether an electronic device points to an external electronic device during an extended decision period according to various embodiments.

FIG. 7 is a diagram illustrating an example of identifying whether an electronic device points to an external electronic device during an extended decision period according to various embodiments.

According to an embodiment, a description of details applicable to FIG. 7 among details described with reference to FIG. 5 and FIG. 6 may not be repeated.

According to an embodiment, when determining that the electronic device 200 points to or does not point to the electronic device 402, a processor 220 may terminate (731) an initially determined first decision period 730 before the first decision period 730 expires. For example, the processor 220 may receive a first frame 711, a second frame 712, and a third frame 713 among advertising frames transmitted by the external electronic device 402 during the first decision period 730. Since an angle 721 based on the first frame 711 is 30 degrees, an angle 722 based on the second frame 712 is 35 degrees, and an angle 723 based on the third frame 713 is 21 degrees, the processor 220 may determine that the number of times the angles are within a specified angle range (e.g., −10 degrees to 10 degrees) is 0. The processor 220 may terminate (731) the first decision period 730 at a time of determining the electronic device 200 does not point to the external electronic device 402 (e.g., a time of receiving the third frame 713 or a time of identifying that the third frame 713 is not received within the specified angle range) even before the first decision period 730 (e.g., 1 s) expires.

According to an embodiment, the processor 220 may receive a fourth frame 714 among the advertising frames transmitted by the external electronic device 402 even after the first decision period 730 is terminated (731). For example, the processor 220 may be in a state of activating an RX antenna even after the first decision period 730 is terminated (731), and may receive the fourth frame 714. The processor 220 may start a second decision period 740 (e.g., 1 s), based on receiving the fourth frame 714.

According to an embodiment, the processor 220 may receive the fourth frame 714, a fifth frame 715, and a sixth frame 716 during the second decision period 740, and may determine that an angle 724 based on the fourth frame 714 is 13 degrees, an angle 725 based on the fifth frame 715 is 7 degrees, and an angle 726 based on the sixth frame 716 is 3 degrees. Since the number of times the angles 724, 725, and 726 are within the specified angle range is 2, the processor 220 may determine that the specified condition is not satisfied but the external electronic device 402 corresponds to a pointing candidate.

According to an embodiment, since the external electronic device 402 is a pointing candidate, the processor 220 may further receive an advertising frame during a second additional period 745. The processor 220 may receive a seventh frame 717 during the second additional period 745, and may determine that an angle 727 based on the seventh frame 717 is 0 degrees. According to an embodiment, since the fifth frame 715, the sixth frame 716, and the seventh frame 717 are received within the specified angle range, the processor 220 may determine that the number of times the angles based on the frames received during the second decision period 740 and the second additional period 745 are within the specified angle range satisfies the specified condition. Therefore, the processor 220 may determine that the electronic device 200 points to the external electronic device 402.

Figure 8:
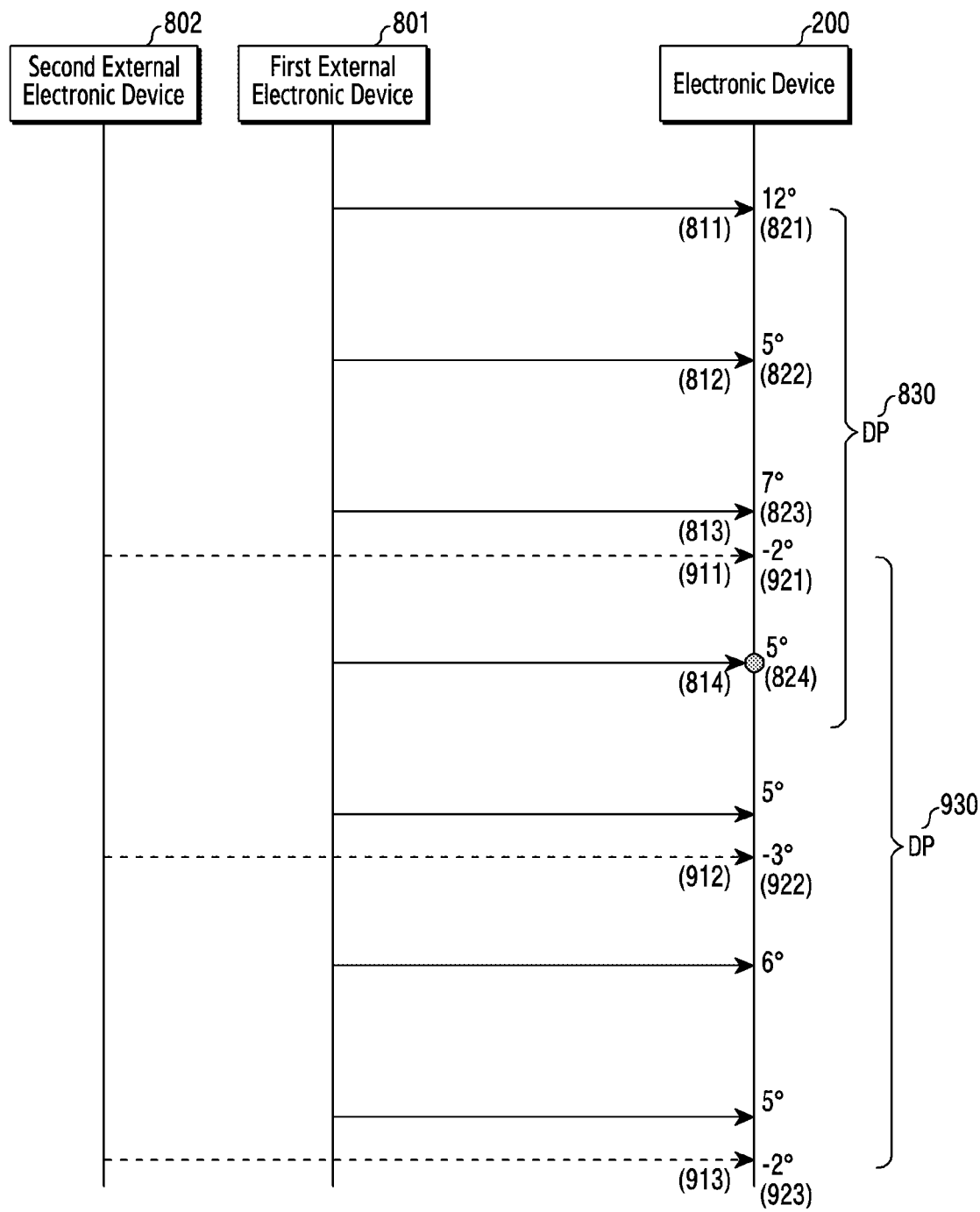
FIG. 8 is a diagram illustrating an example of identifying whether an electronic device points to a first external electronic device or a second external electronic device according to various embodiments.

FIG. 8 is a diagram illustrating an example of identifying whether an electronic device points to a first external electronic device or a second external electronic device according to various embodiments.

According to an embodiment, when there are two or more external electronic devices 801 and 802 adjacent to the electronic device 200, the electronic device 200 may receive an advertising frame transmitted by the first external electronic device 801 and an advertising frame transmitted by the second external electronic device 802. FIG. 8 illustrates an example of a method for identifying whether the electronic device 200 points to the first external electronic device 801 or the second external electronic device 802 when a processor 220 receives the advertising frames transmitted by the two or more external electronic devices 801 and 802.

According to an embodiment, unlike in FIG. 8, when determining that the electronic device 200 points to the first external electronic device 801 in a state of having not received the advertising frame of the second external electronic device 802, the processor 220 may not receive an additional advertising frame. For example, when determining that the electronic device 200 points to a specific advertiser, the processor 220 may terminate a session for receiving an advertising frame in order to reduce power consumption. For example, unlike the embodiment of FIG. 8, when a specified condition is "two successive receptions", the processor 220 may determine that the electronic device 200 points to the first external electronic device 801, based on receiving a third frame 813, and may deactivate a UWB function.

According to an embodiment, as shown in FIG. 8, when receiving the advertising frame (e.g., 911) transmitted by the second external electronic device 802 before determining that the electronic device 200 points to the first external electronic device 801, the processor 220 may defer determining whether the electronic device 200 points to the first external electronic device 801. For example, referring to FIG. 8, the processor 220 may receive a second frame 812 and the third frame 813 transmitted by the first external electronic device 801 during the first decision period 830, based on receiving a first frame 811 among advertising frames transmitted by the first external electronic device 801. The processor 220 may determine that an angle 821 based on the first frame is 12 degrees and is thus not within a specified angle range, an angle 822 based on the second frame 812 is 5 degrees and is thus within the specified angle range, and an angle 823 based on the third frame 813 is 7 degrees and is thus within the specified angle range. According to an embodiment, the processor 220 may receive the first frame 911 among advertising frames transmitted by the second external electronic device 802 before the first decision period 830 expires. According to an embodiment, the processor 220 may further receive a fourth frame 814 among the advertising frames transmitted by the first external electronic device 801 within the first decision period 830, and may determine that an angle 824 based on the fourth frame 814 is 5 degrees and is thus within the specified angle range. The processor 220 may determine that the number of times the angles 821, 822, 823, and 824 based on the frames 811, 812, 813, and 814 received during the first decision period 830 are within the specified angle range satisfy the specified condition (e.g., three successive receptions). When the angles 822, 823, and 824 based on the second frame 812, the third frame 813, and the fourth frame 814 received within the first decision period 830 are within the specified angle range, the processor 220 may not extend the first decision period 830. However, since the processor 220 receives the advertising frame (e.g., the first frame 911) from the second external electronic device 802 before determining that the electronic device 200 points to the first external electronic device 801, the processor 220 may defer determination related to pointing to the first external electronic device 801.

According to an embodiment, when receiving the advertising frame (e.g., 911) transmitted by the second external electronic device 802 before determining that the electronic device 200 points to the first external electronic device 801 and determining that the second external electronic device 802 corresponds to a pointing candidate, the processor 220 may defer determining whether the electronic device 200 points to the first external electronic device 801. For example, referring to FIG. 8, the processor 220 may receive the advertising frame (e.g., the first frame 911) from the second external electronic device 802 before a time when the processor 220 may determine whether the electronic device 200 points to the first external electronic device 801 (e.g., a time at which the fourth frame 814 is received), and may determine that an angle 921 based on the first frame 911 is −2 degrees and is thus within the specified angle range. Since the angle 921 based on the first frame 911 transmitted by the second external electronic device 802 is within the specified angle range, the processor 220 may determine that the second external electronic device 802 is a pointing candidate. Accordingly, since the second external electronic device 802 corresponds to a pointing candidate before the processor 220 determines that the electronic device 200 points to the first external electronic device 801, the processor 220 may defer determination related to pointing to the first external electronic device 801. In another example, unlike in FIG. 8, when the second external electronic device 802 does not correspond to a pointing candidate at the time when the processor 220 may determine whether the electronic device 200 points to the first external electronic device 801, the processor 220 may determine that the electronic device 200 points to the first external electronic device 801.

According to an embodiment, the processor 220 may proceed to a second decision period 930, based on receiving the first frame 911 among the advertising frames transmitted by the second external electronic device 802 in a state of deferring the determination related to pointing to the first external electronic device 801 or in a state before determining that the electronic device 200 points to the first external electronic device 801. The processor 220 may further receive a second frame 912 and a third frame 913 transmitted by the second external electronic device 802 during the second decision period 930. The processor 220 may determine that the angle 921 based on the first frame 911 is −2 degrees, an angle 922 based on the second frame 912 is −3 degrees, and an angle 923 based on the third frame 913 is −2 degrees. Since the number of times the angles 921, 922, and 923 based on the frames 911, 912, and 913 received during the second decision period 930 are successively within the specified angle range (e.g., −10 degrees to 10 degrees) is 3, the processor 220 may determine that the specified condition is satisfied.

According to an embodiment, when the specified condition related to the second external electronic device 802 is satisfied in the state of deferring the determination related to whether the electronic device 200 points to the first external electronic device 801 or in the state before determining that the electronic device 200 points to the first external electronic device 801, the processor 220 may select any one of the first external electronic device 801 and the second external electronic device 802 according to a preset criterion, or may induce a user to select any one of the device 801 and the second external electronic device 802. For example, the processor 220 may compare the angles 821, 822, 823, and 824 based on the advertising frames 811, 812, 813, and 814 transmitted by the first external electronic device 801 and the angles 921, 922, and 923 based on the advertising frames 911, 912, and 913 transmitted by the second external electronic device 802, and may select an advertiser whose angles are closer to 0. In another example, the processor 220 may select an advertiser whose number of times the angles are outside the specified angle range is smaller. Referring to FIG. 8, since both the first external electronic device 801 and the second external electronic device 802 satisfy the specified conditions, the processor 220 may display a user interface (UI) on a display (e.g., the display module 160 of FIG. 1) to select any one advertiser or to allow the user to any one advertiser. For example, the processor 220 may display a user interface (UI) including information about the first external electronic device 801 and the second external electronic device 802 on the display. The processor 220 may display a UI for inducing the user to select one of the first external electronic device 801 and the second external electronic device 802 while displaying the information about the first external electronic device 801 and the second external electronic device 802 on the display. In another example, the processor 220 may output a UI for inducing the user to select any one advertiser using at least some of a sound output module 155, an audio module 170, and a haptic module 179.

An electronic device according an example embodiment may include: a communication circuit configured to support ultra-wideband (UWB) communication and at least one processor electrically connected to the communication circuit. The at least one processor may be configured to: receive a first frame among advertising frames transmitted by an external electronic device through the communication circuit, the first frame including interval information indicating a period in which the advertising frames are transmitted, determine whether at least one frame among the advertising frames is received in a first decision period and whether an angle determined based on a UWB signal including the received at least one frame is within a specified angle range, based on receiving the first frame, determine whether a number of times the angle based on the at least one frame received in the first decision period is within the specified angle range satisfies a specified condition, and determine whether the electronic device points to the external electronic device, based on whether the specified condition is satisfied.

In the electronic device according to an example embodiment, the at least one processor may be configured to: determine that the electronic device points to the external electronic device, based on the specified condition being satisfied, may determine whether the at least one frame is received in a first additional period configured based on the interval information and whether the angle determined based on the UWB signal including the received at least one frame is within the specified angle range, based on the specified condition not being satisfied, and determine whether the electronic device points to the external electronic device according to whether the number of times the angle based on the at least one frame received in the first decision period and the first additional period is within the specified angle range satisfies the specified condition.

In the electronic device according to an example embodiment, the received first frame may further include a window size and an offset associated with a time at which the advertising frames are transmitted along with the interval information, and the at least one processor may be configured to configure the first additional period, based on the interval information, the window size, and the offset.

In the electronic device according to an example embodiment, the at least one processor may be configured to: determine that the specified condition is satisfied based on the number of times the angle based on the at least one frame being within the specified angle range is successively n or greater.

In the electronic device according to an example embodiment, the at least one processor may be configured to determine that the specified condition is satisfied based on the number of times the angle based on the at least one frame being within the specified angle range is m or greater.

In the electronic device according to an example embodiment, the at least one processor may be configured to: identify a distance to the external electronic device, based on the first frame, and determine the specified angle range, based on the distance.

In the electronic device according to an example embodiment, the at least one processor may be configured to: determine whether the external electronic device is a pointing candidate of the electronic device, based on the at least one frame received in the first decision period, based on the number of times the angle based on the at least one frame received in the first decision time is within the specified angle range not satisfying the specified condition, and determine whether the at least one frame is received in the first additional period and whether the angle determined based on the UWB signal including the received at least one frame is within the specified angle range, based on determining that the external electronic device is the pointing candidate of the electronic device.

In the electronic device according to an example embodiment, the at least one processor may be configured to: determine that the external electronic device is the pointing candidate of the electronic device based on there being one or more frames on which the angle is within the specified angle range among the at least one frame received in the first decision period.

In the electronic device according to an example embodiment, the at least one processor may be configured to determine whether the angle is within the specified angle range, based on an angle of arrival of the at least one frame received from the external electronic device through the communication circuit.

In the electronic device according to an example embodiment, the at least one processor may be configured to receive a first advertising frame transmitted by a first external electronic device through the communication circuit, receive a second advertising frame transmitted by a second external electronic device, which is distinguished from the first external electronic device, through the communication circuit, and defer determining whether the electronic device points to the first external electronic device based on determining that the second external electronic device being a pointing candidate of the electronic device, at least based on the second advertising frame, at a time of determining that the electronic device points to the first external electronic device, at least based on the first advertising frame.

A method of operating an electronic device according to an example embodiment may include: receiving a first frame among advertising frames transmitted by an external electronic device through a communication circuit supporting ultra-wideband (UWB) communication, the first frame including interval information indicating a period in which the advertising frames are transmitted, determining whether at least one frame among the advertising frames is received in a first decision period and whether an angle determined based on a UWB signal including the received at least one frame is within a specified angle range, based on receiving the first frame, determining whether a number of times the angle based on the at least one frame received in the first decision period is within the specified angle range satisfies a specified condition, and determining whether the electronic device points to the external electronic device, based on whether the specified condition is satisfied.

In the method of operating the electronic device according to an example embodiment, the determining whether the electronic device points to the external electronic device may include: determining that the electronic device points to the external electronic device, based on the specified condition being satisfied, determining whether the at least one frame is received in a first additional period configured based on the interval information and whether the angle determined based on the UWB signal including the received at least one frame is within the specified angle range, based on the specified condition not being satisfied, and determining whether the electronic device points to the external electronic device according to whether the number of times the angle based on the at least one frame received in the first decision period and the first additional period is within the specified angle range satisfies the specified condition.

In the method of operating the electronic device according to an example embodiment, the received first frame may further include a window size and an offset for transmitting the advertising frames along with the interval information, and configuring the first additional period may include configuring the first additional period, based on the interval information, the window size, and the offset.

In the method of operating the electronic device according to an example embodiment, the determining whether the specified condition is satisfied may include determining that the specified condition is satisfied based on the number of times the angle based on the at least one frame being within the specified angle range is successively n or greater.

The method of operating the electronic device according to an example embodiment may further include identifying a distance to the external electronic device, based on the first frame, and determining the specified angle range, based on the distance.

An electronic device according to an example embodiment may include: a communication circuit configured to support ultra-wideband (UWB) communication and at least one processor electrically connected to the communication circuit. The at least one processor may be configured to: receive a first frame among advertising frames transmitted by an external electronic device through the communication circuit, the first frame including interval information indicating a period in which the advertising frames are transmitted, receive a second frame among the advertising frames in a first decision period, based on receiving the first frame, determine whether a first angle determined based on a UWB signal including the first frame and a second angle determined based on a UWB signal including the second frame are within a specified angle range, determine whether a number of times the first angle and the second angle are within the specified angle range satisfies a specified condition, determine that the electronic device points to the external electronic device, based on the specified condition being satisfied, receive a third frame included in the advertising frames in a first additional period configured at least based on the interval information, based on the specified condition not being satisfied, determine whether a number of times the first angle, the second angle, and a third angle determined based on a UWB signal including the third frame are within the specified angle range satisfies the specified condition, and determine that the electronic device points to the external electronic device, based on the specified condition being satisfied.

In the electronic device according to an example embodiment, the at least one processor may be configured to determine whether the electronic device points to the external electronic device, based on frames received in a first extended decision period including the first decision period and the first additional period.

In the electronic device according to an example embodiment, the received first frame may further include a window size and an offset associated with a time at which the advertising frames are transmitted along with the interval information, and the at least one processor may be configured to configure the first additional period, based on the interval information, the window size, and the offset.

In the electronic device according to an example embodiment, the at least one processor may be configured to determine whether the first angle, the second angle, and the third angle are within the specified angle range, based on angles of arrival of the first frame, the second frame, and the third frame received from the external electronic device through the communication circuit.

The electronic device according to an example embodiment may further include two or more antennas electrically connected to the communication circuit, and the at least one processor may be configured to identify the angles of arrival, based on a phase difference between signals received by the antennas.

What is claimed is:

1. An electronic device comprising:
a communication circuit configured to support ultra-wideband (UWB) communication;
at least one processor including processing circuitry; and
memory storing instructions that, when executed by the at least one processor, cause the electronic device to:
receive a first frame among advertising frames transmitted by an external electronic device through the communication circuit, the first frame comprising interval information indicating a period in which the advertising frames are transmitted, a window size and an offset associated with a time at which the advertising frames are transmitted;
determine whether at least one frame among the advertising frames is received in a first decision period and/or a first additional period and whether an angle determined based on a UWB signal comprising the received at least one frame is within a specified angle range, based on receiving the first frame;
determine whether a number of times the angle based on the at least one frame received in the first decision period and/or the first additional period is within the specified angle range satisfies a specified condition, wherein the first additional period is determined based on the interval information, the window size and the offset;
determine whether the electronic device points to the external electronic device, based on whether the specified condition is satisfied; and
defer determining whether the electronic device points to the external electronic device based on determining that a second external electronic device is a pointing candidate of the electronic device and that a second advertising frame is received from the second external electronic device in the first decision period at least based on the first advertising frame.

2. The electronic device of claim 1, wherein the instructions, when executed by the at least one processor, cause the electronic device to:
determine that the electronic device points to the external electronic device, when the number of times the angle based on the at least one frame received in the first decision period is within the specified angle range satisfies the specified condition;
determine whether the at least one frame is received in the first additional period and whether the angle determined based on the UWB signal comprising the received at least one frame is within the specified angle range, when the number of times the angle based on the at least one frame received in the first decision period is within the specified angle range does not satisfy the specified condition; and
determine whether the electronic device points to the external electronic device according to whether the number of times the angle based on the at least one frame received in the first decision period and the first additional period is within the specified angle range satisfies the specified condition.

3. The electronic device of claim 1, wherein the instructions, when executed by the at least one processor, cause the electronic device to determine that the specified condition is satisfied based on the number of times the angle based on the at least one frame being within the specified angle range is successively n or greater,
wherein the n is a natural number greater than 1.

4. The electronic device of claim 1, wherein the instructions, when executed by the at least one processor, cause the electronic device to determine that the specified condition is satisfied based on the number of times the angle based on the at least one frame being within the specified angle range is m or greater,
wherein the m is a natural number greater than 1.

5. The electronic device of claim 1, wherein the instructions, when executed by the at least one processor, cause the electronic device to:
identify a distance to the external electronic device, based on the first frame; and
determine the specified angle range, based on the distance.

6. The electronic device of claim 1, wherein the instructions, when executed by the at least one processor, cause the electronic device to determine whether the angle is within the specified angle range, based on an angle of arrival of the at least one frame received from the external electronic device through the communication circuit.

7. The electronic device of claim 2, wherein the instructions, when executed by the at least one processor, cause the electronic device to:
determine whether the external electronic device is a pointing candidate of the electronic device, based on the at least one frame received in the first decision period, when the number of times the angle based on the at least one frame received in the first decision period being within the specified angle range does not satisfy the specified condition; and
determine whether the at least one frame is received in the first additional period and whether the angle determined based on the UWB signal comprising the received at least one frame is within the specified angle range, based on determining that the external electronic device is the pointing candidate of the electronic device.

8. The electronic device of claim 7, wherein the instructions, when executed by the at least one processor, cause the electronic device to determine that the external electronic device is the pointing candidate of the electronic device based on there being one or more frames on which the angle is within the specified angle range among the at least one frame received in the first decision period.

9. A method of operating an electronic device, the method comprising:
receiving a first frame among advertising frames transmitted by an external electronic device through a communication circuit configured to support ultra-wideband (UWB) communication, the first frame comprising interval information indicating a period in which the advertising frames are transmitted, a window size and an offset associated with a time at which the advertising frames are transmitted;
determining whether at least one frame among the advertising frames is received in a first decision period and/or a first additional period and whether an angle determined based on a UWB signal comprising the received at least one frame is within a specified angle range, based on receiving the first frame, wherein the first additional period is determined based on the interval information, the window size and the offset;
determining whether a number of times the angle based on the at least one frame received in the first decision period and/or the first additional period is within the specified angle range satisfies a specified condition;

determining whether the electronic device points to the external electronic device, based on whether the specified condition is satisfied; and deferring determining whether the electronic device points to the external electronic device based on determining that a second external electronic device is a pointing candidate of the electronic device and that a second advertising frame is received from the second external electronic device in the first decision period at least based on the first advertising frame.

10. The method of claim 9, wherein the determining of whether the electronic device points to the external electronic device comprises:

determining that the electronic device points to the external electronic device, when the number of times the angle based on the at least one frame received in the first decision period is within the specified angle range satisfies specified condition;

determining whether the at least one frame is received in the first additional period and whether the angle determined based on the UWB signal comprising the received at least one frame is within the specified angle range, when the number of time the angle based on the at least one frame received in the first decision period is within the specified angle range does not satisfy the specified condition; and determining whether the electronic device points to the external electronic device according to whether the number of times the angle based on the at least one frame received in the first decision period and the first additional period is within the specified angle range satisfies the specified condition.

11. The method of claim 9, wherein the determining of whether the specified condition is satisfied comprises determining that the specified condition is satisfied based on the number of times the angle based on the at least one frame being within the specified angle range is successively n or greater, wherein the n is a natural number greater than 1.

12. The method of claim 9, further comprising:

identifying a distance to the external electronic device, based on the first frame; and determining the specified angle range, based on the distance.

13. An electronic device comprising:

a communication circuit configured to support ultra-wideband (UWB) communication; and at least one processor including processing circuitry; and memory storing instructions that, when executed by the at least one processor, cause the electronic device to:

receive a first advertising frame transmitted by an external electronic device through the communication circuit, the first frame comprising interval information indicating a period in which the advertising frames are transmitted, a window size and an offset associated with a time at which the advertising frames are transmitted, receive a second frame among the advertising frames in a first decision period, based on receiving the first frame, determine whether a first angle determined based on a UWB signal comprising the first frame and a second angle determined based on a UWB signal comprising the second frame are within a specified angle range, determine whether a number of times the first angle and the second angle are within the specified angle range satisfies a specified condition, determine that the electronic device points to the external electronic device, based on the specified condition being satisfied, receive a third frame included in the advertising frames in a first additional period configured at least based on the interval information, the window size and the offset, based on the specified condition not being satisfied, determine whether a number of times the first angle, the second angle, and a third angle determined based on a UWB signal comprising the third frame are within the specified angle range satisfies the specified condition;

determine that the electronic device points to the external electronic device, based on the specified condition being satisfied; and defer determining whether the electronic device points to the external electronic device based on determining that a second external electronic device is a pointing candidate of the electronic device and that a second advertising frame is received from the second external electronic device in the first decision period at least based on the first advertising frame.

14. The electronic device of claim 13, wherein the instructions, when executed by the at least one processor, cause the electronic device to determine whether the electronic device points to the external electronic device, based on frames received in a first extended decision period comprising the first decision period and the first additional period.

15. The electronic device of claim 13, wherein the instructions, when executed by the at least one processor, cause the electronic device to determine whether the first angle, the second angle, and the third angle are within the specified angle range, based on angles of arrival of the first frame, the second frame, and the third frame received from the external electronic device through the communication circuit.

16. The electronic device of claim 15, further comprising two or more antennas electrically connected to the communication circuit, wherein the instructions, when executed by the at least one processor, cause the electronic device to identify the angles of arrival, based on a phase difference between signals received by the antennas.

* * * * *